Figure 1:
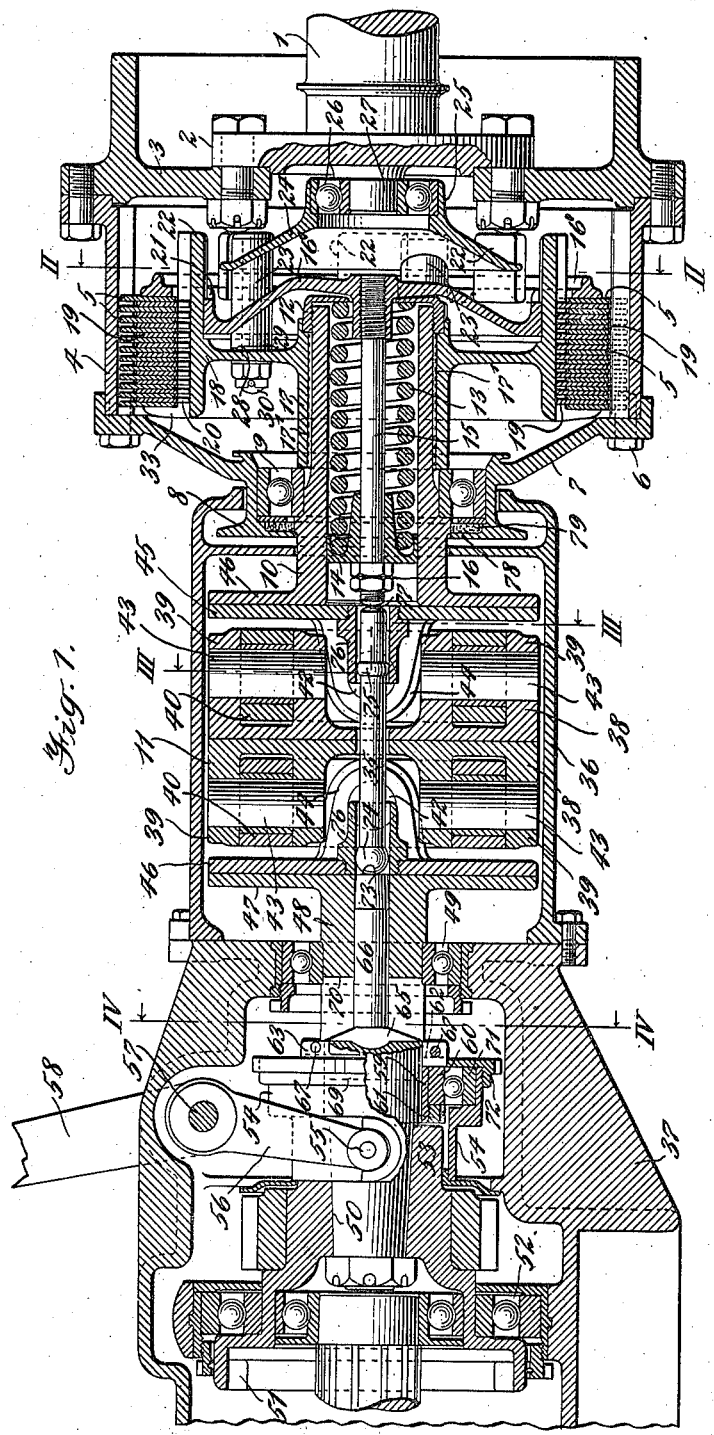

G. E. FRANQUIST.
POWER CONTROLLING APPLIANCE.
APPLICATION FILED MAY 3, 1911.

1,001,835.

Patented Aug. 29, 1911.

2 SHEETS—SHEET 1.

Witnesses:

Inventor
Gustav E. Franquist
By his Attorneys

G. E. FRANQUIST.
POWER CONTROLLING APPLIANCE.
APPLICATION FILED MAY 3, 1911.
1,001,835.
Patented Aug. 29, 1911.
2 SHEETS—SHEET 2.
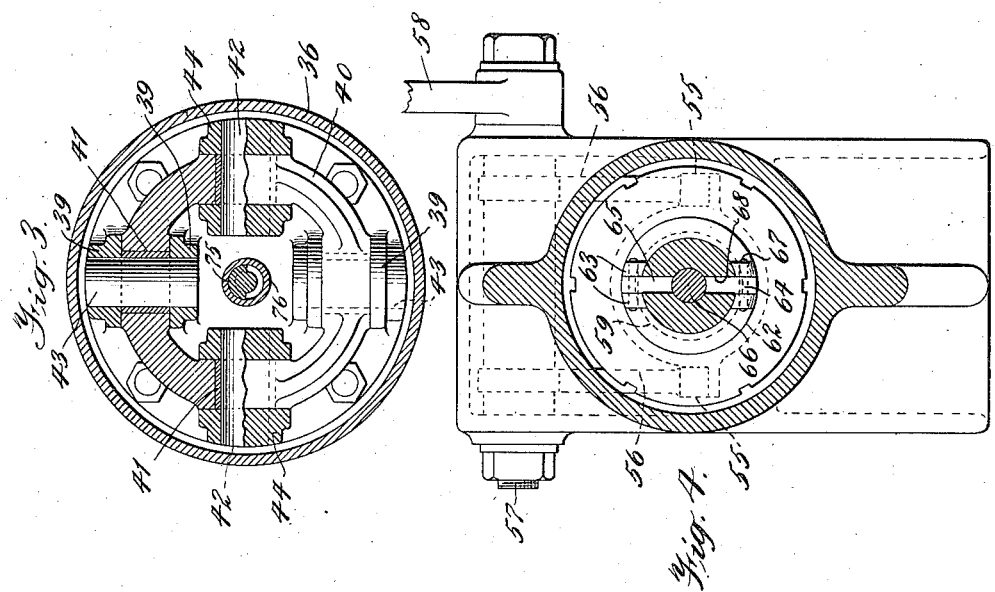
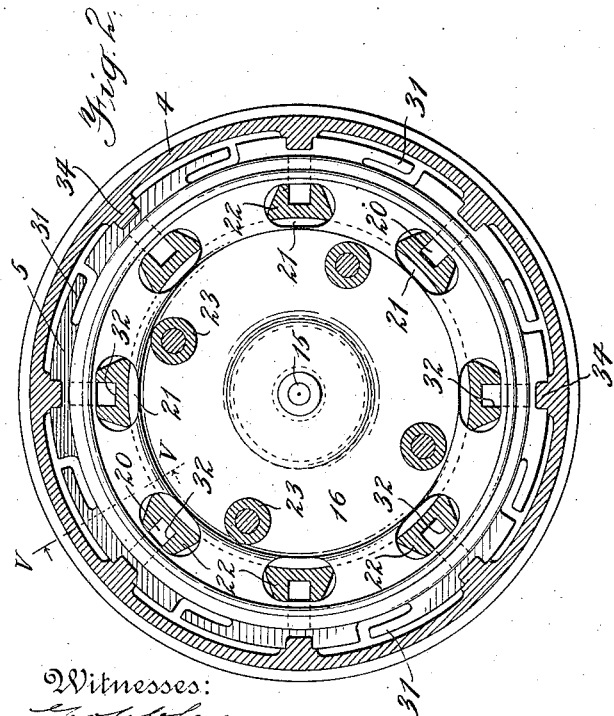
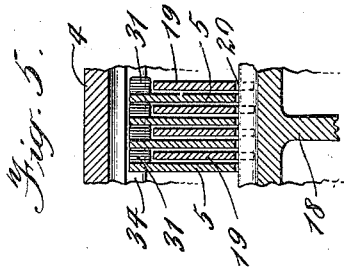

UNITED STATES PATENT OFFICE.

GUSTAVE E. FRANQUIST, OF NEW YORK, N. Y.

POWER-CONTROLLING APPLIANCE.

1,001,835.      Specification of Letters Patent.      Patented Aug. 29, 1911.

Application filed May 3, 1911. Serial No. 624,720.

*To all whom it may concern:*

Be it known that I, GUSTAVE E. FRANQUIST, a citizen of the United States, residing at the city of New York, in the borough of the Bronx and State of New York, have invented certain new and useful Improvements in Power-Controlling Appliances, of which the following is a full, clear, and exact description.

This invention relates to power controlling appliances, and more particularly to a mechanism comprising a jointed power transmitting device and a plurality of co-acting parts adapted preferably for frictional engagement with each other, the said mechanism being provided with novel means whereby one or more of these co-acting parts may be actuated directly through the jointed device without interfering with the normal action of the latter.

The mechanism in question is especially well adapted for use in automobile construction, and the like; and in the particular arrangement herein exemplified it includes a multiple disk clutch in combination with a universal joint, or as it is commonly termed a "universal", the clutch being controlled through the instrumentality of a longitudinally displaceable member disposed substantially along the principal axis of the universal.

One object of my invention is to reduce to a minimum the thickness of the clutch proper, measured axially thereof, whereby the overall length of the combined universal, and the clutch may be made as small as possible; while the arrangement further contemplates the maintenance of the overall diametral dimensions of the parts operatively connected to said clutch, of small size, in proportion to the power to be transmitted by these parts.

My invention further contemplates such an arrangement of operative elements as to permit of readily assembling and disassembling the mechanism, while these elements further co-act to minimize friction therebetween.

Various other novel features are involved, and such features together with those above referred to, will be hereinafter fully described and more particularly set forth in the appended claims.

In the accompanying drawings which form a part hereof and in which like reference characters designate like parts throughout the several views: Figure 1 is a longitudinal vertical section through an automobile drive involving my combined clutch and universal. Fig. 2 is a transverse section of the clutch proper taken on the line II—II of Fig. 1. Fig. 3 is a transverse section of the universal taken on the line III—III of Fig. 1. Fig. 4 is a transverse section taken on the line IV—IV of Fig. 1; and Fig. 5 is a fragmentary detail section, drawn to an enlarged scale, of some of the clutch disks and coöperating parts.

Referring to Fig. 1 the engine shaft 1 is headed as at 2 to provide means for attaching the clutch parts thereto, these parts comprising an end plate 3 which is preferably bolted to the head and which in turn carries a drum 4 to which are attached the alternate disks 5 of a multiple disk friction clutch, the construction of which will be hereinafter more particularly referred to. The drum 4 has secured thereto, as by means of bolts 6, a bearing plate 7 which preferably has somewhat the form of a truncated cone, and is provided with a hub 8 within which is disposed a ball-bearing, broadly designated 9, of any suitable construction, this bearing of course comprising preferably the usual ball races and balls, the inner raceway being seated upon a hollow spindle or sleeve 10, which constitutes one of the connecting elements for uniting the clutch to the elements of the universal joint, which latter has been broadly designated 11. The sleeve 10 carries upon its right hand extremity a gland 12 against which bears one extremity of a helical spring 13 disposed within the sleeve 10. The other extremity of said spring may be seated in an annular recess formed in a spring washer 14 which is mounted upon a rod 15 which extends axially through the sleeve 10, the left hand extremity of this rod carrying nuts 16 which serve to retain the washer in position thereon, and which nuts further afford means for adjusting the degree of compression of the spring. The right hand extremity of rod 15 is threaded into the hub of a pressure plate 16' of somewhat peculiar configuration as shown in Fig. 1.

Around the right hand and reduced extremity of the sleeve 10 is the hub 17 of the interior clutch drum 18, this hub being secured very firmly in place on said sleeve as by keys 17'; and by means of the gland 12 above referred to. Drum 18 carries the alternately disposed clutch disks 19, said disks alternating with disks 5 above referred to, all of these disks being of ring formation; those designated 19 being interiorly tongued at intervals as at 20 as shown in Fig. 5, and being thereby keyed, or otherwise secured, to the interior drum 18 in the usual manner, while correspondingly disks or rings 5 are secured to the exterior drum 4. The respective sets of disks or rings are adapted to rotate freely and independently of each other until pressed into intimate contact with each other by means of the pressure plate 16. This plate is provided with a series of apertures 21 therein, through which extend horns or prongs 22, which are preferably integrally united to and form a part of the drum 18. The interior drum and the pressure plate are hence adapted to rotate together, and this plate is also apertured at a plurality of points for the reception of cylindrical lugs 23 which project from a bearing plate 24, which, like bearing plate 7, has preferably the form of a truncated cone, and which in like manner is provided with a hub 25 within which is disposed a ball bearing 26. The inner race of the ball-bearing 26 is mounted upon an extension 27 which projects axially from the head 2 of the engine shaft. The respective extremities of the lugs 23 are preferably offset as at 28 to adapt them for firm engagement with bosses 29 which are provided upon the web of the inner drum, and suitable bolts 30 extend through this web and firmly unite lugs 23, and thereby the bearing plate 24, to said drum. There is hence provided a space between this plate and the web of the inner drum within which the pressure plate 16 may be reciprocated. The pressure plate is adapted for slidable engagement with the inner drum and is forced to rotate therewith by reason of its engagement with the lugs 23. As the spring 13 is, in this exemplification of my invention, a compression spring, the rod 15 and thereby the pressure plate 16, will be normally urged into clutch engaging position; the action of spring 13 being slightly opposed, however, by the action of a plurality of spring fingers 31 which are preferably formed by incising and striking-up portions of the disks or rings 5; the outer diameters of these disks or rings being greater than those of the disks 19, and these spring fingers being at the peripheries of the disks 5; so that they clear the intermediate disks 19, as best shown in Fig. 2. When therefore the rod 15 is urged to the right as viewed in Fig. 1, spring 13 will be further compressed, but the pressure exerted upon the friction disks will be removed, and, by reason of the spring fingers just mentioned the respective disks will automatically and immediately space themselves apart so that disks 5 will ride freely between disks 19.

As shown in Fig. 2 the grooves 32 for the reception of the inwardly projecting tongues 20 of the disks 19, by means of which said disks are engaged with the drum 18, preferably extend directly through the respective prongs 22 of said drum, these grooves also, for convenience in manufacture, extending directly through the flange 33 of the drum 18, against or toward which the disks are pressed. Correspondingly ribs 34 upon the inner side of the drum 4 engage notches in the outer edges of disks 5. By reason of the arrangement just described it is therefore possible to reduce the axial thickness of the clutch proper to a minimum while securing a maximum strength of construction; the coning of the bearing plates, for example, in itself constituting an important detail in that plates of this form may be made exceedingly strong in proportion to the weight of metal involved. Furthermore the outward direction of the respective coned plates insures a considerable distance between the bearings 9 and 27, an exceedingly meritorious feature.

Referring now to the universal which may be of any suitable construction, provided that the arrangement of parts is such as not to interfere with the passage of a pin 35, or the like, axially therethrough; this pin, or the equivalent thereof, constituting an essential feature of this portion of my device. The universal is inclosed in a suitable casing 36 which is carried upon the right hand extremity of the differential casing 37; being secured thereto in any suitable manner. The universal proper preferably comprises two frames 38 which are secured together in any suitable manner, this portion of the device being made in two parts merely for convenience in manufacture, so that to all intents and purposes frames 38 may be regarded as a single member.

Laterally projecting from the respective frames are lugs 39 which are preferably disposed in pairs, the two pairs upon either side being diametrically opposite to each other. Two swiveled frames 40, best shown in Fig. 3, have a plurality of apertures therein, spaced substantially 90° apart, which are adapted for the reception of bushings 41, in which may be journaled pivot pins 42—43; pins 43 uniting the swiveled frames to the lugs 39, above referred to, while pins 42 correspondingly pivotally connect said frames to lugs 44, two pairs of which project laterally from the left hand face of a plate 45. This lugged plate is firmly secured in any suitable manner to the flanged extremity 46 of the sleeve 10; so that when this sleeve is rotated, the several elements of the universal will be correspondingly revolved.

The universal may be substantially symmetrical with respect to the plane of jointure of the frames 38; so that the left hand side thereof, as viewed in Fig. 1, is pivotally connected to a lugged plate 46, which may be similar in all respects to plate 45; and which is in turn united to the flanged extremity 47 of a slotted transmission spindle 48. This spindle is journaled in ball bearings 49, preferably mounted in the adjacent end of the differential casing 37, and the left hand extremity thereof may be coned as at 50 for engagement with the hub of one of the differential gears, said gear being designated 51. The construction of the differential *per se* forms no part of the present invention and has hence been shown in part only. It will therefore be sufficient to state that the hub of the gear 51 immediately adjacent the gear proper is journaled in a ball bearing 52 which is mounted in the casing 37, and the spindle 50 is hence indirectly supported by this bearing and held against longitudinal displacement by it and the bearing 49 above referred to.

Around the spindle 50 and, in part, the extremity 53 of the hub of gear 51, is a non-revoluble collar 54; this collar being pivotally connected at diametrically opposite points 55 to the extremities of the arms 56 of a yoke. This yoke is mounted on a rock shaft 57 which is journaled in casing 37, and is adapted to be oscillated about its pivotal axis by a foot lever 58 which is secured to one extremity of said rock shaft. Secured to the body of the spindle 50 is a sleeve 59 which carries a ball bearing, the inner race 50 of this bearing being firmly clamped in position on said sleeve between a collar 61 which is threaded onto one extremity of said sleeve and a flange 62 disposed at the other extremity of the same. This flange carries slotted lugs 63, the slots 64 through which are adapted for the reception of a flat and preferably somewhat trapezoidally shaped key 65, which is adapted for engagement with a reciprocably mounted plug or pin 66. The respective ends of the key 65 are apertured for pins 67 which are disposed in the lugs 63, so that when the sleeve 59 and race 60 are advanced to the right, in the manner hereinafter described, pin 66 will be correspondingly driven toward the right, while when this pin is returned to its left hand position, in which it is shown in Fig. 1, it will force the sleeve and its ball race to the left. The key 65 may be moved to the right in the manner described because the body of the spindle 50 is correspondingly slotted at 68, this slot extending transversely through said spindle, as shown in Fig. 4, and extending from 69 to 70 as indicated in Fig. 1; the said spindle, of course, being bored axially for the reception of the pin 66.

The right hand end of collar 54, as viewed in Fig. 1, is enlarged and recessed for the reception of the outer ball race 71 of the ball bearing above referred to, this race being held in place in the collar by a gland 72. When therefore the foot lever or treadle 58 is swung toward the differential casing it urges the collar 54 and, through the instrumentality of the ball bearing in question, the pin 66 to the right. The right hand extremity of this pin is preferably flattened as at 73 to adapt it for engagement with the rounded or spherical end 74 of the pin 35 above referred to. This latter pin, as aforesaid, extends through the parts of the universal and is so formed and mounted as to adapt it for a slight angular displacement with respect to the normal axis of said universal. This has been accomplished in the present instance by providing the substantially spherical end or head 74 just mentioned, and by forming a collar 75 adjacent the other extremity, the peripheral surface of this collar being preferably also rounded as shown. The head 74 and collar 75 hence each have but a line bearing in their respective supporting sleeves 76, these sleeves being substantially identical with each other and each having a threaded engagement with one of the lugged plates 45—46. The right hand end of pin 35 is also preferably slightly rounded as at 77 to adapt it for a single point engagement with the correspondingly rounded extremity of the alined spring bolt or rod 15.

By reason of the novel arrangement just described, it is possible to at all times actuate the clutch in the manner described regardless of the disposition of the parts of the universal, since the movement of the elements thereof with respect to each other is always moderate, especially along the axial line, and the provision of the rounded extensions on the pin 35 is more than sufficient to accommodate this limited relative displacement of parts along said line. The said arrangement, however, permits of a reduction in the overall diametral dimensions of the universal and clutch operating parts, to a minimum, while affording a simple and relatively inexpensive construction. The elements, too, are easily replaceable and the mechanism as a whole can be readily assembled and disassembled.

It may be pointed out that but one spring, if we except the spring fingers 31, is employed in the entire mechanism, the foot lever being returned to its upper position by this spring, *i. e.* the clutch spring 13, when the pressure upon said lever is released.

The casing formed by the outer drum 4, bearing plate 7, end plate 3 and head 2, may be made substantially liquid tight so that the friction disks may virtually run in oil, or other lubricant, and to this end the left hand extremity of the bearing plate 7 may be provided with a lip 78 which is adapted to retain a packing ring 79 in position, this ring being held between said lip and the ball races of the bearing 9. It is advisable also to snugly seat the spring abutment or washer 14 in the bore of the spindle 10 so that no lubricating fluid may escape therethrough.

While I have shown one form of my novel mechanism, I do not wish to be limited to the particular structure exemplified, since I am aware of many variations which may be made within the purview of the invention, which I regard as one of considerable breadth and merit, and hence desire to be limited only by the scope of the claims appended hereto.

In the particular embodiment of my invention herein shown and described in detail, the operation is briefly as follows: Assuming that the engine shaft 1 is being driven, then as long as the foot lever 58 is in open clutch position, i. e. swung to the left, the pin 66 will be pressed to the right and thereby pin 35 will be correspondingly held, pressing the rod 15 and the pressure plate 16' also to the right, and the respective disks 5 and 19 will be spaced apart by the action of the spring fingers 31 of the disks 5. Disks 5 will rotate freely between disks 19 and the engine shaft will hence run idle. When the lever 58 is moved or is allowed to move to the right, the pins 66 and 35 will be correspondingly moved to the left and the clutch thrown into operation by the spring 13; power being then transmitted through the frictionally engaged clutch disks from the engine shaft to the differential gears.

It is evident from the construction above described that the universal is free to perform its function regardless of the position of the foot lever; and that whether the engine shaft and differential be in or out of alinement the clutch may be controlled with equal facility.

Having described my invention, I claim:

1. In a device of the class described, the combination of a clutch with a universal, and means for operating said clutch, said means having an operative portion thereof disposed substantially along the axis of rotation of said universal.

2. In a device of the class described, the combination of a clutch with a universal, and means for operating said clutch, said means having an operative portion thereof disposed within the confines of rotative elements of said universal.

3. In a device of the class described, the combination of a clutch with a universal, and means for operating said clutch, said means having an operative portion thereof disposed within the confines of rotative elements of said universal, and extending directly through at least one of said rotative elements.

4. In a device of the class described, the combination of a clutch with a universal, and means for operating said clutch, said universal comprising a frame, and said clutch operating means operating directly through said frame.

5. In a device of the class described, the combination of a clutch with a universal, and means for operating said clutch, said universal comprising a frame, and said clutch operating means comprising a longitudinally displaceable part located within said frame.

6. In a device of the class described, the combination of a clutch with a universal, and mechanism for operating said clutch, said universal comprising a frame, and said clutch operating mechanism comprising a pin extending through said frame.

7. In a device of the class described, the combination of a plurality of coöperating clutch elements, a spring for actuating one of said elements, a universal operatively connected to one of said clutch elements, and means for moving said spring actuated element in opposition to said spring, said means comprising a pin extending through a part of said universal, said pin being longitudinally displaceable therein.

8. In a device of the class described, the combination of a plurality of coöperating clutch elements, a spring for actuating one of said elements, a universal operatively connected to one of said clutch elements, and means for moving said spring actuated element in opposition to said spring, said means comprising a longitudinally displaceable pin disposed substantially along the general axis of revolution of said universal.

9. In a device of the class described, the combination of a plurality of parts adapted for frictional engagement with each other, with a universal, and means for actuating one of said plurality of parts comprising an operative portion disposed within the confines of rotative elements of said universal.

10. In a device of the class described, the combination of a plurality of parts adapted for frictional engagement with each other, with a universal, and means for actuating one of said plurality of parts comprising a longitudinally displaceable pin, and a support for said pin having a ball and socket connection therewith.

11. In a device of the class described, a plurality of revoluble parts adapted for frictional engagement wth each other, with a jointed transmitting device comprising a revoluble frame, and means for actuating one of said revoluble parts, a portion of said means extending through said frame.

12. In a device of the class described, a plurality of friction disks, a pressure plate for said disks, a jointed power transmitting device operatively connected to some of said disks, said device comprising a frame and parts pivotally connected to said frame, and means for moving disks with respect to each other, said means comprising a longitudinally displaceable member disposed in said frame, substantially along the axis thereof.

13. In a device of the class described, a plurality of friction disks, a pressure plate for said disks, a jointed power transmitting device operatively connected to some of said disks, said device comprising a frame and parts pivotally connected to said frame, and means for moving said disks with respect to each other, said means comprising a longitudinally displaceable member disposed in said frame, substantially along the axis thereof, said member being also angularly displaceable with respect to said axis.

14. In a device of the class described, a plurality of friction disks, a pressure plate for said disks, two concentric drums between which said disks are mounted, some of said disks being attached to one of said drums and some of said disks being attached to the other of said drums, some at least of said disks being laterally displaceable with respect to said drums, one of said drums having lateral projections thereon and said plate having apertures adapted for the reception of said projections whereby said drum and plate are forced to rotate together, and means for actuating said pressure plate, said means comprising a spring adapted to move said plate in one direction, an abutment for said spring movable with said pressure plate, and a pin disposed substantially in alinement with the axis of said disks, said pin being longitudinally displaceable in the general direction of said axis, movement of said pin toward said drums displacing said spring abutment and pressure plate.

15. In a device of the class described, a multiple disk clutch comprising two concentric disk-supporting drums, a pressure plate having the body thereof normally disposed within the inner of said drums, connections between said plate and said inner drum, a spring for normally maintaining said plate in operative position with respect to said disks and means for moving said plate against the action of said spring.

16. In a device of the class described, a multiple disk clutch comprising two concentric disk-supporting drums, a bearing plate, means for securing said plate to the inner of said drums, said plate being held in spaced relationship to said inner drum, a reciprocably mounted pressure plate movable between the spaced parts just mentioned, and means for actuating said pressure plate.

17. In a device of the class described, a hollow spindle, a plurality of friction disks, two concentric supporting drums for said disks, one of said drums being partially supported upon said hollow spindle, said spindle and said last mentioned drum being revoluble independently of each other, and the other of said drums having a fixed connection with said spindle, a spring in said hollow spindle, a pressure plate normally held by said spring in operative position with respect to said disks, and means for moving said plate in opposition to said spring.

18. In a device of the class described, a hollow spindle, a plurality of friction disks, two concentric supporting drums for said disks, one of said drums being partially supported upon said hollow spindle, said spindle and said last mentioned drum being revoluble independently of each other, and the other of said drums having a fixed connection with said spindle, a spring in said hollow spindle, a pressure plate normally held in operative position with respect to said disks, jointed parts attached to said spindle and means for moving said plate in opposition to said spring, said means comprising a pin disposed in the interior of said jointed parts.

19. In combination, a hollow spindle, a slotted spindle, pivotal connections between said spindles, a shaft, clutch connections between said hollow spindle and said shaft and operating means for said clutch connections, said operating means comprising a rod disposed in said hollow spindle, a longitudinally displaceable pin in said slotted spindle, and a second pin extending through said pivotal connections.

20. In combination, a clutch, a transmission spindle, pivotal connections between said clutch and said spindle, and means for operating said clutch, said means comprising a plurality of alined parts adapted to abut against each other.

21. In combination, a clutch, a spindle, pivotal connections between said clutch and spindle, and means for operating said clutch, said means comprising a plurality of disconnected elements adapted to abut against each other.

In witness whereof, I subscribe my signature, in the presence of two witnesses.

GUSTAVE E. FRANQUIST.

Witnesses:
 WALDO M. CHAPIN,
 JAMES D'ANTONIO.